A. KIPNISS AND M. P. NEUMANN.
MACHINE FOR MAKING BOBBINS FOR ELECTRIC BATTERIES.
APPLICATION FILED OCT. 1, 1917.
1,318,882.  Patented Oct. 14, 1919.
3 SHEETS—SHEET 2.
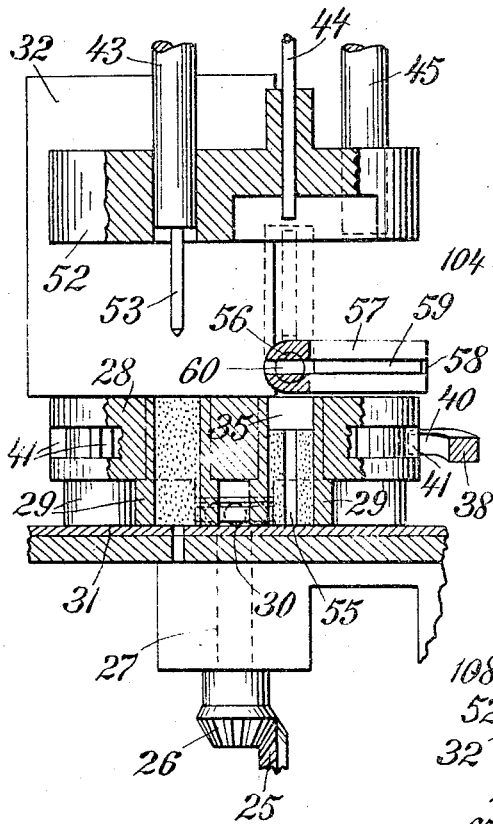
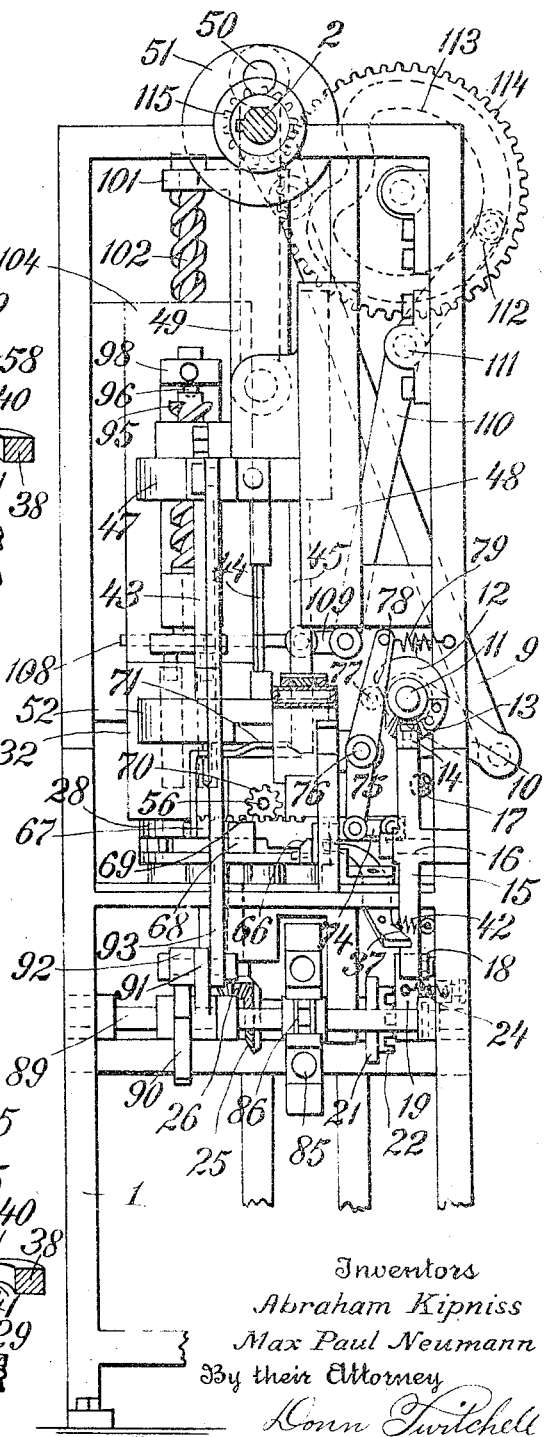
Inventors
Abraham Kipniss
Max Paul Neumann
By their Attorney A. KIPNISS AND M. P. NEUMANN.
MACHINE FOR MAKING BOBBINS FOR ELECTRIC BATTERIES.
APPLICATION FILED OCT. 1, 1917.
1,318,882.
Patented Oct. 14, 1919.
3 SHEETS—SHEET 3.
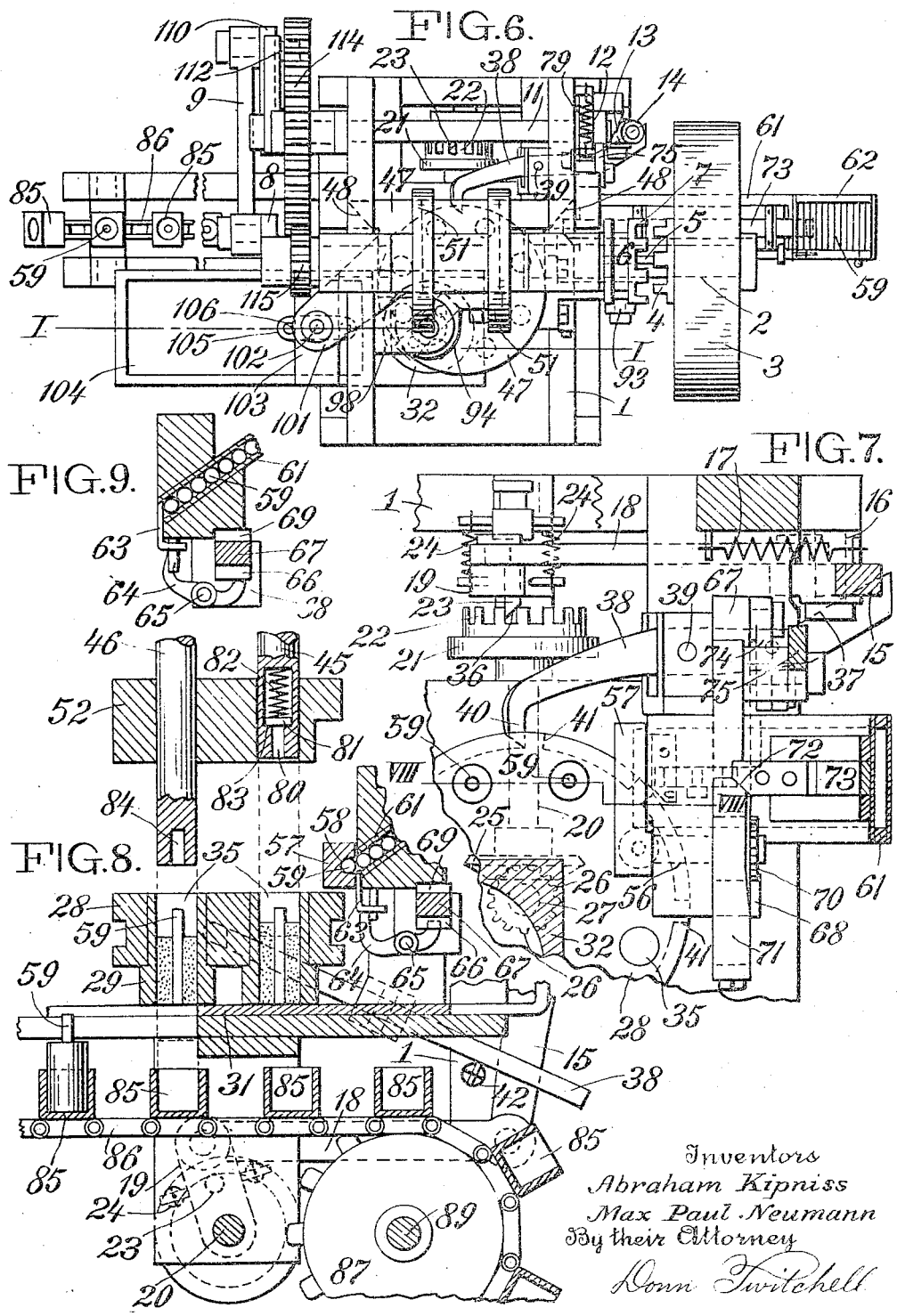

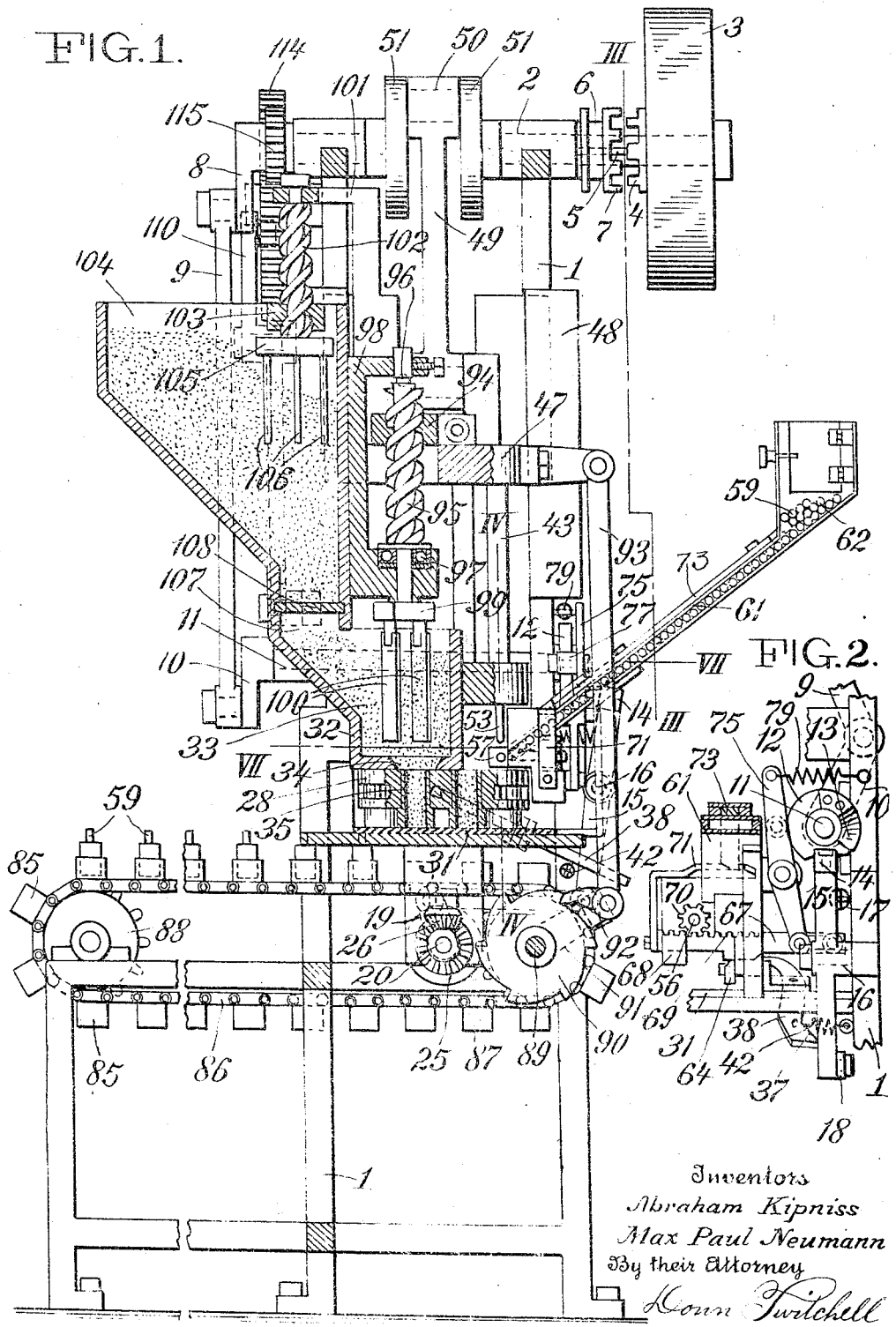

UNITED STATES PATENT OFFICE.

ABRAHAM KIPNISS AND MAX PAUL NEUMANN, OF BROOKLYN, NEW YORK, ASSIGNORS, BY MESNE ASSIGNMENTS, TO NATIONAL CARBON COMPANY, INC., A CORPORATION OF NEW YORK.

MACHINE FOR MAKING BOBBINS FOR ELECTRIC BATTERIES.

1,318,882.    Specification of Letters Patent.    Patented Oct. 14, 1919.

Application filed October 1, 1917. Serial No. 194,174.

*To all whom it may concern:*

Be it known that we, ABRAHAM KIPNISS, a citizen of the United States, and a resident of the borough of Brooklyn, city of New York, in the county of Kings and State of New York, and MAX PAUL NEUMANN, a citizen of the United States, and a resident of the borough of Brooklyn, city of New York, in the county of Kings, have invented a certain new and useful Machine for Making Bobbins for Electric Batteries, of which the following is a specification.

This invention is an improvement on a machine for shaping carbon to bobbin form for use in electric batteries; for which we obtained a patent on January 2, 1917, No. 1,211,176.

The object of the present invention is to provide automatic mechanism which will press powdered graphite, or any suitable depolarizing material, sufficiently to cause it to hold together and to cause a stick of previously pressed carbon forming an electrode rod to be effectually secured therein.

It has been learned by experience that more pressure is required to compress the graphite than is required to cause the carbon stick to be retained therein, for which reason we have in the present invention provided means for pressing the graphite around a removable core, previous to the time the carbon stick is placed in the hole thus formed and for again pressing the graphite, so that this carbon stick will be retained therein.

The invention consists of an intermittently rotating carrier provided with a series of compressing chambers which are successively filled with powdered graphite from a magazine; each of said filled chambers passing in succession beneath a series of plungers; the first of said plungers adapted to compress and punch a hole through the graphite in one of said chambers; the second of said plungers adapted to force a stick of previously pressed carbon into said hole in said pressed graphite; the third of said plungers adapted to further compress the graphite in said chamber, and to press said graphite around said carbon stick, the plunger having a recess for receiving one end of said carbon stick, which end is thereby left protruding beyond the compressed graphite; the fourth and last of said plungers adapted to force said pressed graphite and carbon stick out of said chamber and into one of a series of receptacles forming part of an intermittently-moving conveyer adapted to move the bobbin thus formed away from said carrier.

In the accompanying drawings—

Figure 1 is a sectional elevation of the machine, the section being taken on the line I—I of Fig. 6.

Fig. 2 is an end view of a part of the machine, as viewed from the right in Fig. 1, showing certain parts in a different position from that shown in Fig. 1.

Fig. 3 is a vertical section on the line III—III of Fig. 1.

Fig. 4 is a vertical section on the line IV—IV of Fig. 1, as viewed from the right.

Fig. 5 is a view similar to Fig. 4, showing certain parts in a different position.

Fig. 6 is a plan view of the machine.

Fig. 7 is a horizontal section on the line VII—VII of Fig. 1.

Fig. 8 is a sectional elevation on the line VIII—VIII of Fig. 7, as viewed from below.

Fig. 9 is a detail view showing a device for controlling the outlet of a magazine for previously pressed carbon sticks in different position from that shown in Fig. 8.

Journaled in suitable bearings on the main frame 1 of the machine is a shaft 2. Loosely mounted on the shaft 2 is a pulley 3, the hub of which is provided with teeth 4. In engagement with a spline 5 on shaft 2 is a sliding collar 6 having teeth 7 which are adapted for engagement with teeth 4 when the collar is moved toward the pulley 3, whereby rotation of the pulley causes rotation of shaft 2.

Secured to one end of shaft 2 is a crank-arm 8 which is connected by a link 9 to a longer arm 10 secured to a shaft 11, which shaft is thereby given a rocking motion. Secured to rock-shaft 11 is a disk 12, to one side of which is secured a cam 13. Adapted for engagement with cam 13 is a roller 14 which is journaled on one end of a lever 15 pivoted at 16, the roller being held against said cam by means of a spring 17 attached to the lever and to frame 1. The other end of lever 15 is connected by a link 18 to an arm 19 which is loosely mounted on a shaft 20. Secured to shaft 20 is a disk 21 provided with teeth 22. Mounted in arm 19 is a sliding pin 23 which is forced by springs 24 into engagement with one of said teeth 22, whereby a partial revolution of shaft 20 is caused when lever 15 is moved to the position shown in Figs. 1, 3, 6, 7 and 8, by means of cam 13. Secured to shaft 20 is a bevel gear wheel 25 in mesh with a bevel gear wheel 26 half its diameter, which is secured to a vertical shaft 27. To the upper end of shaft 27 is secured a disk 28 having a series of hollow cylinders 29 located near its periphery and extending parallel with the vertical shaft 27. The disk 28 rests upon a series of balls 30 which are supported on a base plate 31 attached to the main frame. The cylinders 29 are open at both ends, and the disk 28 is so supported by the balls 30 that the lower open end of each cylinder barely touches the base-plate 31.

As shown in Figs. 1 and 6, a magazine 32 containing powdered graphite 33 is so placed above the disk 28 that the outlet 34 of the magazine is directly above one of the chambers 35 formed by the interior of said cylinders 29, so that powdered graphite will descend into said chamber to rest on said base-plate 31.

The sliding pin 23 has an inclined end 36 so that when cam 13 permits return-movement of lever 15 and arm 19, no movement will be imparted to the shaft 20, gears 25 and 26, shaft 27 and disk 28. During return movement of lever 15, the lower end thereof moves against an incline 37 formed on one end of a lever 38 pivoted at 39, thereby causing the opposite hooked end 40 of said lever 38 to be thrown out of engagement with one of a series of teeth 41 which are formed on the periphery of the disk 28. When return movement of arm 19 causes the sliding pin to engage another tooth 22, and another movement of rock-shaft 11 again causes cam 13 to actuate lever 15 and arm 19, another partial revolution of shaft 20 will occur, with the consequent partial revolution of gears 25 and 26, of vertical shaft 27 and disk 28. At the same time the movement of lever 15 permits movement of lever 38 by means of a spring 42, thereby causing the hooked end 40 thereof to be moved into range with the teeth 41 of disk 28, so that when the disk is rotated the distance caused by the cam 13 further movement of the disk will be prevented by the engagement of another of the teeth 41 with the end 40 of lever 38. A repetition of the operation of this mechanism by successive movements of the rock-shaft 11 causes the disk 28 to carry the graphite filled chambers 35 of cylinders 29 successively to rest beneath a series of plungers 43, 44, 45 and 46 which extend downward from a sliding cross-head 47. Cross-head 47 is caused to reciprocate vertically in guides 48 by means of a pitman 49 connected to a crank-pin 50 forming part of cranks 51 which are secured to the driving shaft 2.

Plunger 43 is made round in cross-section and of the same diameter as the chambers 35 and reciprocates in a corresponding guide formed in a stationary part 52. Extending downward from the lower end of plunger 43 is a core rod or punch 53 of much smaller diameter than the plunger. During downward movement of the slide 47 the core rod 53 passes through and perforates the graphite in one of said chambers 35, the lower end of the rod entering an opening 54 formed in the base-plate 31, while the plunger 43 acts to compress the graphite against the wall of the chamber, against the base-plate, and against the core rod, as shown in Fig. 5.

When cranks 51 cause upward movement of the slide 47 and consequent movement of the plunger 43 from the position shown in Fig. 5 to the position shown in Figs. 3 and 4, crank arm 8 causes movement of rock-shaft 11 and cam 13, thereby actuating lever 15, which causes rotary movement of the disk 28 and consequent movement of the chamber 35 having the pressed graphite with the hole 55 formed therein to rest beneath the plunger 44, as shown in Fig. 4. In line with the longitudinal axes of plunger 44 and hole 55 in said graphite, is a shaft 56 extending at right angles thereto, and having an attached arm 57 provided with a recess 58 in which a stick of previously pressed carbon 59 is placed, the recess 58 being in line with a hole 60 extending through the shaft 56, as shown in Fig. 4.

In line with the recess 58 of arm 57 is the outlet end of a chute 61, which is inclined downward from a magazine 62 containing previously pressed carbon sticks 59. One of the carbon sticks is permitted to roll from the chute into the recess 58 of arm 57 by downward movement of a gate 63 which rests on one end of a lever 64 pivoted at 65. The other end of lever 64 is adapted for engagement with an inclined lug 66 extending downward from a bar 67 which is free to slide in guides 68. The upper side of bar 67 is provided with a rack 69 which is in mesh with a gear wheel 70 secured to the shaft 56. Secured to bar 67 is an arm 71, the end of which is adapted for engagement with an inclined surface 72, forming part of a sliding bar 73, the upper end of which extends in among the carbon sticks 59 in the magazine 62 near the entrance to the chute 61. Bar 67 is connected by a link 74 to one end of a lever 75 pivoted at 76. The other end of lever 75 is pivoted with a roller 77 adapted for engagement with a cam surface 78 formed on the periphery of the disk 12, the lever being held against the cam surface by means of a spring 79 connected to the lever and to the main frame.

The movement of rock-shaft 11 which caused cam 13 acting on lever 15 to move the disk 28 and caused the chamber 35 having the pressed graphite with the hole 55 to rest beneath plunger 44 and shaft 56, also caused cam surface 78 of the disk 12 acting on roller 77 to permit movement of the lever 75 and slide 67 to the position shown in Fig. 3. The inclined lug 66 acting on lever 64 has then caused downward movement of the gate 63, the rack 69 acting on gear 70 has caused arm 57 to swing to the position shown in Figs. 4 and 8, so that a carbon stick 59 has moved into the recess 58, and arm 71 acting on incline 72 has permitted the bar 73 to move downward, thereby permitting the carbon sticks in the hopper 62 to move toward the entrance to the inclined chute 61. Movement of rock-shaft 11 in the opposite direction then causes cam surface 78 acting on roller 77 to actuate lever 75, and thereby move slide 67 in the opposite direction, which causes arm 71 to act on incline 72 of bar 73 and thereby cause upward movement of the end of the bar in the hopper 62, whereby the carbon sticks are moved or agitated so that they will readily roll into the chute 61; said movement of slide 67 causing inclined lug 66 to act on lever 64 and thereby cause gate 63 to be raised to the position shown in Fig. 9, whereby the outlet of the inclined chute 61 is closed; said movement of said slide 67 also causing rack 69 to actuate gear wheel 70 and thereby cause arm 57 and carbon stick 59 to be moved to the position shown in Fig. 5 and by dotted lines in Fig. 4.

When cross-head 47 moves downward plunger 44 having a diameter equal to the carbon stick 59 and forming part of said cross-head, is moved down through a guide in stationary part 52, and forces the carbon stick 59 through hole 60 of shaft 56 and down into the hole 55 that has been formed in the graphite compressed in the chamber 35, as shown in Fig. 5.

When cross-head 47 moves upward, another rotating movement of disk 28 carries the chamber 35 having the pressed graphite and carbon stick therein from the position shown in Fig. 5 to the position shown in Fig. 8, beneath the plunger 45; then when the cross-head again moves downward, plunger 45, having the same diameter as the chamber 35 and forming part of the cross-head, is moved down through a guide in stationary part 52. The lower end of plunger 45 is provided with a recess 80 having the same diameter as the carbon stick and a disk 81 of larger diameter which is forced by a spring 82 against shoulder 83, and acts during downward movement of the plunger to press the carbon stick against base-plate 31, while the upper end of the carbon stick passes up into the recess 80 and plunger 45 acts to compress the graphite against the wall of the chamber, against the base-plate, and against the side of the carbon stick, thereby causing the graphite to adhere to the carbon stick and hold it securely in place. It will be seen that the portion of the carbon stick entering the recess 80 formed in the plunger 45 is left protruding beyond the compressed graphite, when the plunger is moved to the position shown by dotted lines in Fig. 8.

Another upward movement of the cross-head 47 and rotary movement of disk 28 carries the chamber 35 having the graphite compressed around the carbon stick to the position shown on the left hand side of Fig. 8 and beneath the plunger 46. When the cross-head again moves downward, plunger 46 having the same diameter as the chamber 35 is moved down through a guide formed in stationary part 52, the lower end of the plunger having a recess 84 of a length exceeding that of said protruding part of the carbon stick. Plunger 46 is adapted during its downward movement, to force the compressed graphite and carbon stick, or bobbin as it may now be called, out of the compressing chamber 35 and into one of a series of receptacles 85 which are mounted on an endless chain 86 traveling over sprocket wheels 87 and 88. Chain wheel 87 is secured to a shaft 89 to which a ratchet wheel 90 is secured. Pivoted on shaft 89 is an arm 91 carrying a pivoted pawl 92 adapted for engagement with the teeth of the ratchet wheel. Arm 91 is connected by a link 93 to the cross-head 47, so that as the cross-head moves upward, shaft 89 is rotated, thereby causing the receptacle 85 containing said bobbin to be moved away and another receptacle 85 to be moved into its position beneath the plunger 46.

Secured to cross-head 47 is a nut 94 engaging a vertical screw 95 which is mounted on ball bearings 96 and 97 in a stationary part 98 attached to the main frame. To the lower end of screw 95 is secured a cross-bar 99 having a plate 100 secured to each end thereof, and extending downward into the powdered graphite in magazine 32. During the vertical reciprocating movement of cross-head 47, the nut 94 acting on screw 95 causes an oscillating movement of the plates 100, thereby acting as an agitator for the graphite in the magazine 32.

Also secured to cross-head 47 is an arm 101 having one end of a screw 102 journaled thereon. In engagement with screw 102 is a nut 103 which is attached to the upper end of an auxiliary magazine 104 for powdered graphite. To the lower end of screw 102 is secured a bar 105 having a series of rods 106 extending down into the graphite in auxiliary magazine 104. Vertical reciprocating movement of the screw 102 through the stationary nut 103 causes rotation of the screw together with the bars 105 carrying the rods 106 simultaneously with up and down movement thereof in the graphite, whereby the graphite is agitated and kept in condition for passing through the outlet 107 into the magazine 32 when the valve 108 is opened. Valve 108 is connected by a link 109 to one end of a lever 110 which is pivoted at 111. The other end of lever 110 is provided with a roller 112 in engagement with a cam groove 113 formed in a gear wheel 114. Gear wheel 114 is in mesh with a pinion 115 which is secured to the driving shaft 2. Several revolutions of the driving shaft cause one revolution of the gear wheel 114. The cam groove 113 is so shaped that once in every revolution of gear wheel 114, lever 110 will be actuated thereby, causing valve 108 to be opened, whereby graphite is permitted to descend from the auxiliary magazine 104 to magazine 32.

It is obvious that various modifications may be made in the construction shown in the drawings and above particularly described within the principle and scope of our invention.

Having described our invention what we claim is:

1. A machine of the character described comprising a carrier having a series of compressing chambers, means whereby said chambers may be successively filled with powdered material, means whereby successively in said chambers said material in said chambers may be partly compressed and a hole punched therein, means whereby successively in said chambers a stick of previously pressed carbon may be placed in said hole in the compressed material, means operating successively in said chambers for further compressing said material in each said chamber and around said carbon stick and whereby a portion of said carbon stick is left protruding beyond said compressed material, and means operating successively in said chambers whereby the bobbin formed by said compressed material and carbon stick may be forced out of each said compressing chamber.

2. A machine of the character described comprising a carrier having a series of compressing chambers; a magazine for powdered material, located above said carrier; means for imparting an intermittent rotary movement to said carrier, whereby said chambers are successively moved beneath said magazine and are thereby filled with powered material; a reciprocating slide, having a series of plungers; one of said filled chambers coming to rest beneath one of said plungers at the end of one of said rotary movements of said carrier, which first plunger is adapted to compress and punch a hole in said material; said chamber coming to rest beneath another of said plungers at the end of another rotary movement of said carrier, which second plunger is adapted to force a stick of previously pressed carbon into said hole in said compressed material; said chamber coming to rest beneath another of said plungers at the end of another rotary movement of said carrier, which third plunger is adapted for further compressing said material in said chamber and around said carbon stick; said chamber coming to rest beneath another of said plungers at the end of another rotary movement of said carrier, which fourth plunger is adapted to force the bobbin formed by said compressed material and carbon stick out of said chamber.

3. A bobbin making machine having, in combination, an intermittently rotating carrier having a series of compressing chambers, a magazine for powdered depolarizing material having an outlet for supplying said chambers successively with the depolarizing material, an agitator in the magazine to keep the powdered depolarizing material in condition for passing through the outlet into the chambers, an auxiliary magazine having an outlet opening into the first magazine, means for controlling the outlet of the auxiliary magazine, an agitator in the auxiliary magazine to keep the powdered depolarizing material in condition for passing through the controlled outlet into the first magazine, and bobbin-forming means for acting upon the depolarizing material in said chambers.

4. A bobbin making machine having, in combination, a mold for depolarizing material, a plunger for inserting an electrode rod into the mold, a rod-containing hopper having an outlet for the electrode rods, means for bringing the electrode rods from the hopper outlet into alinement with the rod-inserting plunger, and a reciprocating agitator extending into the hopper adjacent to its outlet for preventing the electrode rods in the hopper clogging the outlet of the hopper.

5. A machine of the character described, comprising an intermittently rotating carrier having a series of cylindrical chambers; means whereby powdered depolarizing material may be fed successively to said chambers; a reciprocating slide having a series of plungers moving in line with the longitudinal axes of certain of said chambers when at rest; one of said plungers having a core extension adapted to punch a hole in said material in each said chamber successively, said plunger being adapted partly to compress said material in said chamber and around said core extension of said plunger; means coöperating with a second of said plungers whereby successively in said chambers a stick of previously pressed carbon is fed to said hole formed in said material by said core extension; a third of said plungers acting successively in said chambers further to compress said material in each said chamber and around said carbon stick, this third named plunger having a recess for receiving one end of said carbon stick, which end is thereby left protruding beyond said compressed material; and a fourth of said plungers serving to force the bobbin formed by said compressed material and carbon stick out of said chamber.

6. A bobbin making machine having, in combination, an upright mold for depolarizing material, a vertically moving plunger for inserting an electrode rod into the mold, a rod-containing hopper having an outlet for delivering the electrode rods substantially in horizontal position, and a rocking rod-positioning member having a rod-receiving groove in the side thereof adapted to register with the hopper outlet for receiving an electrode rod and such member being adapted in its rocking movement to bring the rod into vertical position in alinement with the rod-inserting plunger.

7. A bobbin making machine having, in combination, an upright mold for depolarizing material, a vertically moving plunger for inserting an electrode rod into the mold, a rod-containing hopper having an outlet for delivering the electrode rods substantially in horizontal position, a gate in control of such outlet, a rocking arm having therein a longitudinal groove for receiving an electrode rod from the hopper outlet and bringing it into vertical position in alinement with the rod-inserting plunger, and means for actuating said outlet gate and rocking arm and rod-inserting plunger in proper sequence.

8. A machine of the character described comprising a bottom-forming base; an intermittently rotating carrier having a series of chambers above and adapted to be closed at their lower ends by said base, a magazine for powdered depolarizing material located above said carrier and adapted to fill one of said chambers with loose uncompressed depolarizing material at each successive movement of said carrier; a vertically reciprocating slide having a series of plungers adapted successively to enter certain of said chambers as they successively come to rest beneath said plungers; one of said plungers being adapted to punch a hole in and compress the material in one of said chambers that has been filled from said magazine; means including a second of said plungers whereby a stick of previously pressed carbon is fed to said hole punched in said compressed material; a third of said plungers serving further to compress said material in said chamber and against said bottom-forming base and around said carbon stick, this third plunger having yielding means adapted to force said carbon stick against said bottom-forming base, and also having a recess for receiving one end of said carbon stick, which end is thereby left protruding beyond said compressed material; and a fourth of said plungers serving to force the bobbin formed by said compressed material and carbon stick out of said chamber.

9. A machine of the character described comprising a compressing chamber, means whereby said chamber may be filled with powdered material, means whereby said material in said chamber may be partly compressed and a hole punched therein, means whereby an electrode rod may be placed in said hole in the compressed material, means for further compressing said material in said chamber and around said electrode rod, and means whereby the bobbin formed by said compressed material and electrode rod may be forced out of said compressing chamber.

10. An electrode-making machine having, in combination, a mold, means for supplying loose uncompressed depolarizing material to the mold to form an unpunched charge therein, and means for concurrently initially compressing and punching a hole in the previously unpunched charge of depolarizing material in the mold at a single operation.

11. An electrode-making machine having, in combination, a mold, means for supplying depolarizing material to the mold, means for concurrently compressing and punching a hole in the depolarizing material in the mold at a single operation, means for inserting an electrode rod in the hole in the charge of depolarizing material, means for further compressing the depolarizing material around said electrode rod, and means for discharging the completed electrode from the mold.

12. An electrode-making machine having, in combination, a mold, means for supplying depolarizing material to the mold, a compressing plunger for compressing the depolarizing material in the mold, and a punching rod fixedly projecting from the compressing end of the compressing plunger for punching a hole in the depolarizing material in the mold concurrently with the compression thereof by the compressing plunger.

13. An electrode-making machine having, in combination, a mold, means for supplying depolarizing material to the mold, a compressing plunger for compressing the depolarizing material in the mold, a punching rod fixedly projecting from the compressing end of the plunger for punching a hole in the depolarizing material in the mold concurrently with the compression thereof by the compressing plunger, a plunger for inserting an electrode rod in the hole in the depolarizing material in the mold, and a second compressing plunger for further compressing the depolarizing material around said electrode rod and to a predetermined length.

14. An electrode-making machine having, in combination, a series of similar molds, a series of four dissimilar plungers, means for bringing the different molds and plungers into successive alinement, means for supplying depolarizing material to the successive molds, and means for producing relative movement of the alined molds and plungers for causing the plungers to operate upon the material in the molds; the first of said plungers being a combined compressing and punching plunger adapted to compress and punch a hole in the material in the mold, the second of said plungers being adapted to insert an electrode rod in the hole in the material in the mold, the third of said plungers being a compressing plunger for further compressing the material around the electrode rod and to a predetermined length, and the fourth of said plungers being an ejecting plunger for discharging the completed electrode from the mold.

15. The invention claimed in claim 14 in combination with means for successively supplying electrode rods in alinement with the rod-inserting plunger and the hole in the charge of depolarizing material in the mold to be pushed by such plunger into the hole in such material.

Signed at New York city in the county of New York and State of New York this 22nd day of September A. D. 1917.

ABRAHAM KIPNISS.
MAX PAUL NEUMANN.